June 1, 1937.   T. LINGA   2,082,294
CARBURETOR
Filed Oct. 8, 1936
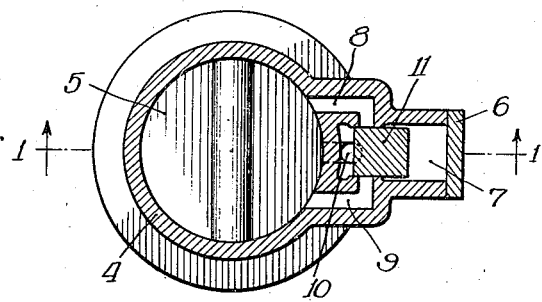
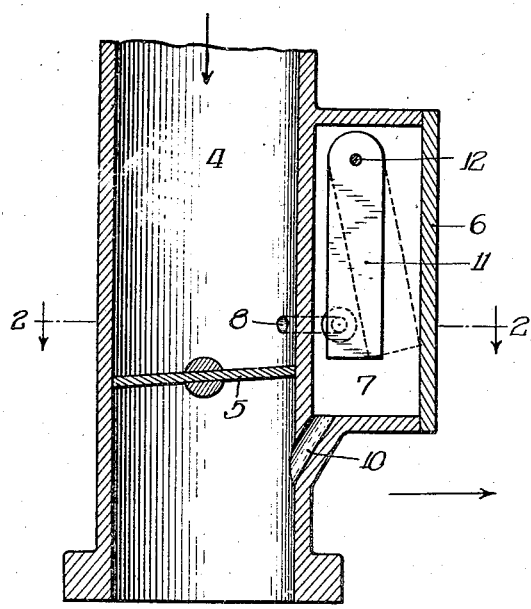
Inventor:
Torbjorn Linga, Patented June 1, 1937

2,082,294

UNITED STATES PATENT OFFICE 2,082,294

CARBURETOR

Torbjorn Linga, Kokomo, Ind.

Application October 8, 1936, Serial No. 104,661

4 Claims. (Cl. 277—54)

The present invention relates or pertains to certain betterments and advantageous characteristics in carburetors and similar appliances and has as its especial object the provision of means to prevent the stalling of the internal-combustion engine of a vehicle when the throttle-valve of the carburetor is suddenly closed causing a rapid deceleration of the vehicle, particularly when the brakes are also applied, as in stopping an automobile.

Most automobile motors or engines have a tendency to cease functioning upon quick closing of the carburetor throttle-valve if the idling speed of the engine has been set low, say about five miles per hour, the reason for this inclination to cease operation being that the liquid fuel in the intake-manifold, some of which lines the walls of the manifold and some of which is entrained in the air as small drops or globules, evaporates at a faster rate under the greatly increased suction due to such throttle closing and therefore causes a temporarily over-rich fuel mixture for the engine-cylinders.

If, in addition to such specified condition, the brakes are applied to the automobile wheels to abruptly stop its progress, the liquid fuel in the intake manifold rushes forwardly therein, causing an unequal distributiton to the engine-cylinders, which, of course, aggravates the stalling tendency.

If the idling speed of a car has a comparatively low adjustment of about five miles per hour, such proneness for the engine to cease operation is great, but if the idling speed is set at eight to ten miles per hour, such characteristic is much less; but many automobile drivers object to so high an idling speed.

The main object of this invention, which is described hereinafter in detail, is to prevent or avoid such engine stalling by providing a by-pass around the throttle-valve and supplying means to open such by-pass automatically for the period of deceleration of the vehicle, thus allowing the motor a comparatively-high idling speed for a few moments and hence permitting it to satisfactorily use such over-rich fuel-mixture for such short periods, and, when this by-pass ultimately closes, the motor will continue in operation because by that time the fuel-mixture in the intake-manifold will have become substantially normal for idling conditions.

To enable those skilled in this art to understand the new invention fully both from structural and functional standpoints, a present preferred embodiment of the same has been shown in detail in the figures of the accompanying drawing, in the views of which like reference numerals have been employed to designate the same parts.

In this drawing:—

Figure 1 is a vertical section on line 1—1 of Figure 2 of that portion of any suitable type of carburetor having a throttle-valve and equipped with the new means for the elimination of the stalling tendency; and Figure 2 is a horizontal section on line 2—2 of Figure 1.

In this carburetor, the induction-passage 4 is supplied with the customary throttle-valve 5 and the front side of such portion of the carburetor, that is, the side toward the front or radiator of the automobile has a hollow enlargement 6, thus internally providing an upright chamber 7 rectangular in horizontal cross-section which is closed to the atmosphere but which is connected to the induction passage 4 by the two conduits 8 and 9 above the throttle-valve and by the passage 10 below such throttle-valve, and, from an understanding of such construction, it will be readily appreciated that the passages 8, 9, 7 and 10 unitedly or conjointly comprise a by-pass around the throttle-valve, and, in order that such by-pass may be opened and closed automatically, the construction also incorporates a pendulum-valve 11 in the chamber 7 and fulcrumed near its top end at 12, such valve being made of a square bar and when hanging down in normal vertical position, as shown in Figures 1 and 2, closing the connections between the conduits 8 and 9 and the chamber 7.

From what precedes it will be readily understood that when the throttle-valve is quickly closed causing rapid deceleration of the vehicle, this pendulum-valve 11 will swing forwardly automatically toward the dotted-line position indicated in Figure 1, thereby temporarily opening the by-pass, and, consequently, for a few moments, increasing the idling speed of the engine due to the increased delivery of fuel thereto, which augmented speed satisfactorily cares for the temporarily super-rich fuel-mixture, and when the period of deceleration terminates, the pendulum by gravity automatically swings back to its normal upright position, closing the by-pass; but, as will be easily comprehended, the efficient function of the valve and by-pass will have accomplished the desired result by allowing the motor a few moments of faster than normal idling during the critical period referred to.

Stated somewhat differently, the temporary opening of the by-pass accomplishes practically the same result as would be reached by a slight opening of the throttle-valve, but, of course, the pendulum-valve functions entirely automatically and without attention on the part of the driver of the automobile.

Whereas hereinbefore a desirable embodiment of the invention has been presented, it is to be understood that the invention is not limited to the precise and exact details of structure shown and described and that various modifications may be resorted to without departure from the heart and essence of the invention as defined by the appended claims which should be construed as generically as is permissible by the state of the prior art.

It will be readily understood that the cross-sectional area of the openings 8 and 9 can be such (oblong for instance) that the pendulum will uncover them more or less according to the rate of deceleration.

I claim:

1. In a carburetor for an internal-combustion engine of a vehicle, the combination of an induction-passage, a throttle-valve for said passage, and means, actuated by inertia, to automatically temporarily supply to the engine a sufficiently increased quantity of fuel-mixture to prevent the engine from stalling upon closure of the throttle-valve and deceleration of the vehicle.

2. In a carburetor for an internal-combustion engine of a vehicle, the combination of an induction-passage, a throttle-valve for said passage, a by-pass around said throttle-valve, and an automatically-operated valve, actuated by inertia, controlling said by-pass, and temporarily opening said by-pass more or less depending on the rate of vehicle deceleration, whereby to prevent stalling of the engine.

3. In a carburetor for an internal-combustion engine of a vehicle, the combination of an induction-passage, a throttle-valve for said passage, a by-pass around said throttle-valve, and an automatically-acting gravity-actuated pendulum-valve, normally closing said by-pass, but temporarily opening said by-pass upon closure of the throttle-valve and deceleration of the vehicle, whereby to prevent stalling of the engine.

4. In a carburetor for an internal-combustion engine of a vehicle, the combination of an induction-passage, a throttle-valve for said passage, and inertia-actuated means to automatically temporarily supply to the engine a sufficiently increased quantity of fuel-mixture to prevent stalling of the engine upon closure of the throttle-valve.

TORBJORN LINGA.